(12) United States Patent  (10) Patent No.: US 8,355,500 B2
Perrine et al.  (45) Date of Patent: Jan. 15, 2013

(54) DEVICE AND A METHOD FOR PERFORMING A CRYPTOGRAPHIC FUNCTION

(75) Inventors: Jerome Perrine, Romanel-sur-Morges (CH); Roan Hautier, Cuarnens (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 137 days.

(21) Appl. No.: 13/077,195

(22) Filed: Mar. 31, 2011

(65) Prior Publication Data

US 2011/0249814 A1 Oct. 13, 2011

(30) Foreign Application Priority Data

Apr. 8, 2010 (EP) .................................... 10159372

(51) Int. Cl.
 *G06F 21/00* (2006.01)
(52) U.S. Cl. ......................................................... 380/28
(58) Field of Classification Search ...................... 380/28
See application file for complete search history.

(56) References Cited

U.S. PATENT DOCUMENTS

| | | | | |
|---|---|---|---|---|
| 5,218,621 | A * | 6/1993 | Cudak et al. .................. | 375/232 |
| 6,195,669 | B1 * | 2/2001 | Onodera et al. ................. | 708/3 |
| 6,498,851 | B1 * | 12/2002 | Wong ............................. | 380/266 |
| 6,624,773 | B2 * | 9/2003 | Wong ............................. | 341/136 |
| 6,788,787 | B1 * | 9/2004 | Shono et al. ..................... | 380/46 |
| 6,946,981 | B1 * | 9/2005 | Zilberman et al. .............. | 341/50 |
| 7,167,116 | B2 * | 1/2007 | Kim ................................ | 341/110 |
| 7,545,929 | B1 | 6/2009 | Babb et al. | |
| 7,647,615 | B1 | 1/2010 | Reinold et al. | |
| 2003/0001981 | A1 * | 1/2003 | Milne .......................... | 348/839 |
| 2003/0095659 | A1 * | 5/2003 | Ishihara et al. ................ | 380/46 |
| 2003/0118186 | A1 * | 6/2003 | Gilley .......................... | 380/268 |
| 2003/0121043 | A1 * | 6/2003 | Reinold et al. .................. | 725/62 |
| 2006/0018482 | A1 * | 1/2006 | Lee .............................. | 380/275 |
| 2008/0025504 | A1 * | 1/2008 | Rapp et al. ...................... | 380/46 |
| 2008/0037379 | A1 * | 2/2008 | Arakawa ................... | 369/44.11 |
| 2009/0220076 | A1 * | 9/2009 | Kuraki et al. .................. | 380/54 |

OTHER PUBLICATIONS

European Search Report issued in European Application No. EP 10 15 9372, dated Aug. 30, 2010.
Allen Gersho, "Perfect Secrecy Encryption of Analog Signals," IEEE Journal on Selected Areas in Communications, vol. SAC-2, No. 3, pp. 460-466, May 1984.

* cited by examiner

*Primary Examiner* — Michael Pyzocha
(74) *Attorney, Agent, or Firm* — DLA Piper LLP US

(57) ABSTRACT

The present invention provides a method and an apparatus for encrypting and decrypting digital information while imparting a high level of security on the encrypted digital information. A mixed-mode digital-analogue encryption and decryption technique is proposed, which minimizes the probability of an unintended recipient of the thus encrypted information being able to decrypt the information using known reverse engineering techniques.

18 Claims, 4 Drawing Sheets

DEVICE AND A METHOD FOR PERFORMING A CRYPTOGRAPHIC FUNCTION

CROSS REFERENCE TO RELATED APPLICATIONS

This application claims priority under 35 U.S.C. Section. 119 to European application No. EP 10159372.1, entitled "A DEVICE AND METHOD FOR PERFORMING A CRYPTOGRAPHIC FUNCTION" filed Apr. 8, 2010, the contents of which are hereby incorporated by reference herein.

INTRODUCTION

The present invention relates to the domain of encryption and decryption of electronically transmitted information. More particularly, the invention concerns the encryption of digital information under a key to give encrypted digital information and the further decryption by intended recipients of the encrypted digital information.

STATE OF THE ART

The encryption and decryption of digital electronic information is commonplace nowadays and can be readily found in the fields of banking, software protection, data protection, digital rights management, telecommunications, where the transmission of sensitive information is to be secured, and in broadcasting, especially where such broadcasting involves the transmission of high value content.

Most cryptographic algorithms use key agreement protocols, where a sender and a recipient of encrypted information agree on a key. Keys can be symmetric, where the same key is used to encrypt and to decrypt. Symmetric key technology also covers the use different keys which related in an easily computable way. in asymmetric key technology on the other hand, a public key is used to encrypt and a private key, different from the public key, to decrypt. Such algorithms are described in Standards such as DES, RSA or the Diffie-Hellman Key Exchange Protocol for example or any other standard such as the Advanced Encryption Standard (AES), as recommended by the National Institute for Standards and Technology (NIST). The strength of the encryption used in these types of algorithms depends somewhat on which particular algorithm is used and on the length and type of key which is used and is subject to the keys being kept secret.

As mentioned in the Introduction, the domain of the present invention is the encryption and decryption of digital information, however since the invention involves analogue electronic processing techniques, it is appropriate to include analogue encryption/decryption techniques in the description of the state of the art.

Analogue encryption techniques are commonly employed in the domain of communications and the domain of telephony for speech encoding purposes. The techniques in use involve scrambling either in the time domain or the frequency domain.

Instead of scrambling, other techniques are also used in analogue encryption. For example, U.S. Pat. No. 7,545,929 describes an analogue encryption technique whereby part of the analogue signal to be encrypted is isolated and combined with a modulation signal. The modulation signal is combined with the original analogue signal to give an encrypted analogue signal.

Mixed-mode encryption techniques exist wherein an analogue signal is first sampled and converted to the digital domain before carrying out the encryption in the digital domain and optionally re-converting the result to the analogue domain. U.S. Patent Application 2001/0021252 describes a widely accepted approach to encrypting telephone communications whereby an analogue input signal is converted to a digital input signal, the digital input signal is encrypted under a digital key and the resulting encrypted digital input signal is re-converted to an analogue output signal representative of the analogue input signal.

International Patent Application WO2007/120006 describes a mixed-mode method and apparatus for voice signal encryption/decryption for securing a real-time voice communication. The analogue voice signal is converted to a digital voice signal and then encrypted/scrambled using known means. The voice signal being sampled in real time, or a delayed version of it, is added to the encrypted/scrambled voice signal.

U.S. Patent Publication US7647615B1 describes an audio input interface, which receives digital audio and video signals and comprises digital to analog converters to allow it to process the signals in the analogue domains. The document discusses analogue decryption but only in the same context as the documents already mentioned above.

U.S. Patent Publication US7545929B1 describes an apparatus and method for encrypting analogue data. No conversion between digital and analogue domains is used. The circuit describes takes an analogue signal and combines it with a modulating signal.

Thus state of the art encryption techniques allow for digital information to be encrypted and decrypted using industry standard key agreement algorithms or for analogue information to be converted to digital information which can then be encrypted and decrypted using these same industry standard techniques. State of the art encryption techniques for analogue information also exist but the encryption thus afforded by such techniques is generally considered to be less secure than with digital encryption.

BRIEF SUMMARY OF THE INVENTION

In the domain of electronic cryptography it is possible for a third party to reverse-engineer an encryption algorithm which has been implemented in digital hardware and to build an emulation of that algorithm, usually in software, which may be used to circumvent the hardware encryption algorithm thus allowing the third party to have access to information which has been encrypted using the encryption algorithm. One of the purposes of the present invention is to provide a novel method and apparatus for realising a digital encryption algorithm in hardware while rendering the reverse engineering of the hardware sufficiently difficult to provide a high level of security compared to present state of the art encryption hardware.

The invention seeks therefore to minimise the probability of an unintended recipient of information encrypted according to the invention being able to decrypt the information by discovering the encryption key or by otherwise circumventing the encryption algorithm. This goal is achieved using a method for performing a digital cryptographic function on at least one digital first value (XD) and at least one digital second value (KD), said digital cryptographic function having at least one digital result, said method comprising the following steps:

a) converting the at least one digital first value (XD) into at least one analogue first value (XA), b) converting the at least one digital second value (KD) into at least one analogue key value (KA), c) performing an analogue function (F) on the at least one analogue first value (XA) and the at least one analogue key value (KA) to give at least one analogue output value (RA), and d) converting the analogue output value (RA) to give a digital output value (RD) representing the result of the digital cryptographic function.

The present invention further provides for a device for performing a digital cryptographic function according to the method above, on at least one digital first value (XD) using at least one digital second value (KD), said digital cryptographic function having at least one digital result, said device comprising:

means to convert the at least one digital first value (XD) into at least one analogue first value (XA), means to convert the at least one digital second value (KSD) into at least one analogue key value (KA), means to perform an analogue function (F) on said analogue first value and said analogue key value to give an analogue result (RA) and means to convert said analogue result into a digital value to give a digital output value (RD) representing the result of the digital cryptographic function.

The problem of preventing a third party from being able to build a software emulator of a cryptographic function which has been realised in digital hardware is therefore solved by providing mixed digital and analogue hardware techniques to make encryption and decryption algorithms.

BRIEF DESCRIPTION OF THE DRAWINGS

The present invention will be better understood thanks to the detailed description which follows and the accompanying drawings, which are given as non-limiting examples of embodiments of the invention, namely.

DETAILED DESCRIPTION

An embodiment of the present invention may be deployed in a system for performing a cryptographic function on a first value under a second value to give an encrypted or decrypted output.

Figure 1:
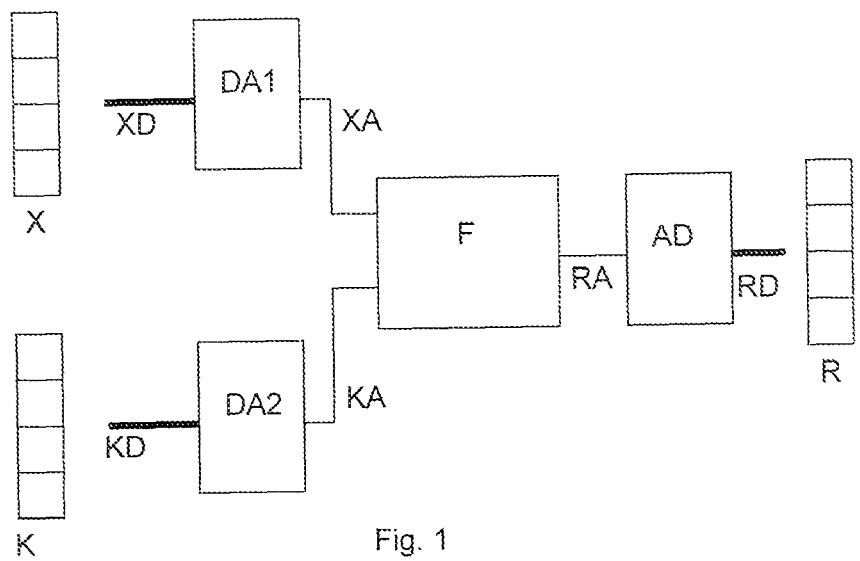
FIG. 1 showing a block diagram of part of a cryptographic system in which an embodiment of the present invention may be deployed.

FIG. 1 shows a schematic diagram of part of a system for encrypting (or decrypting) digital information in which an embodiment of the present invention may be deployed. The block shown in the schematic diagram takes a digital first value (XD) as input to be encrypted or decrypted and a second digital value (KD) as an encryption (or decryption) key and gives an encrypted (or decrypted) digital value (RD) as output. In other words, the block therefore performs a digital cryptographic function on a first digital operand (XD) and a second digital operand (KD) to output a digital result (RD).

According to an embodiment of the present invention, the digital first value (XD) is converted to give an analogue first value (XA) using a first digital to analogue converter (DA1). Similarly, the second digital value (KD) is converted to an analogue key value (KA) using a second digital to analogue converter (DA2). An analogue function (F) is applied to the two analogue values to give an analogue result (RA). Using an analogue to digital converter (AD), the analogue result (RA) is converted to a digital value thus giving an encrypted digital output (RD) representing the encryption of the digital first value at the input (XD). As shown in FIG. 1, the input to be encrypted (XD) may be stored in an input register (X) and the second digital value (KD), in this case representing an encryption key value, may be stored in an encryption key register (K), Similarly, the analogue-to-digital converted result (RD) may be stored in a result register (R). It is worth noting that in practice, the block shown in FIG. 1 may represent only part of a complete encryption system which may further comprise other conditioning circuitry to make up a complete encryption algorithm, much of which will be described hereafter.

As is well known in digital electronics, an n-bit digital value can be represented by a set of n states, each state having one of two binary values, namely zero or one. These states can be defined as voltage states or current states for example although other types of states are also possible. such as direction of polarity, frequency value etc. The digital to analogue converter (DA1, DA2) should preferably convert values from the digital domain to the analogue domain, the form of such conversion leading to any analogue quantity such as voltage, current, frequency or charge, for example. Similarly, the analogue to digital converter (AD) should convert an analogue quantity such as voltage, current, frequency or charge, for example, to the digital domain represented by voltages or currents for example.

The analogue function (F) can be any predefined analogue function acting on at least two analogue inputs and giving an analogue output. For example. arithmetic functions involving addition, subtraction, multiplication or log functions or any combination thereof may be used. In an embodiment of the present invention it is convenient to use a switched capacitor circuit to realise an arithmetic function in the case where the analogue values are represented as charge. Indeed the practice of realising division functions or addition functions is well known to people skilled in the art of switched capacitor circuit design. In another embodiment of the present invention, the digital values are represented by voltage states and the digital to analogue converters convert from the digital voltage domain to the analogue current domain. As is well known to people skilled in the art, the realisation of addition functions is straightforward using circuits working in the current domain. Similarly, in the frequency domain, frequency multiplying circuits are readily available as well as other types of mixing circuits to realise different mathematical functions.

Using the basic building blocks which are available to realise basic arithmetical or mathematical functions in analogue electronic circuitry as described above, it is further possible to build analogue circuits to realise more complex mathematical functions involving polynomial functions including functions involving raising an operand to the power of two or to the power of three etc. Any of the aforementioned mathematical functions can be used to realise the analogue function (F) of the present invention.

Figure 2:
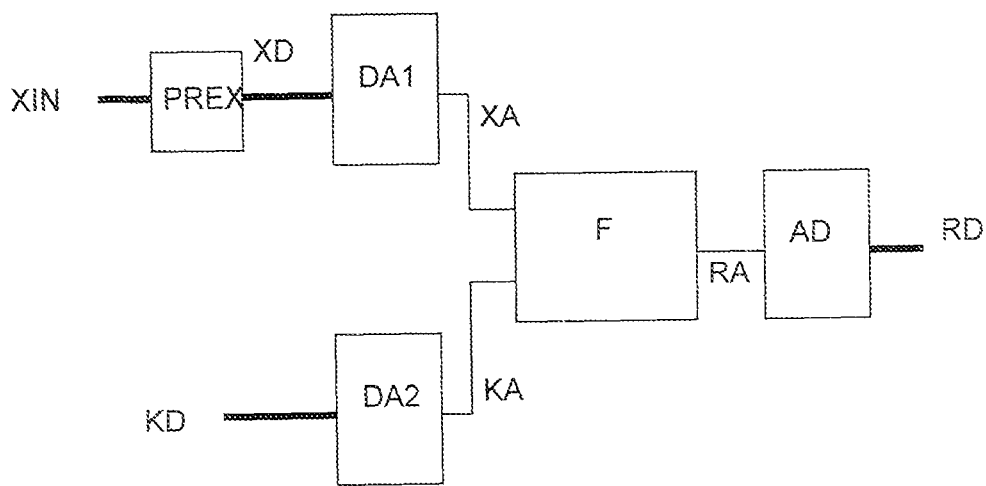
FIGS. 2 to 6 showing alternative embodiments of parts of the cryptographic system described in FIG. 1.

According to another embodiment of the present invention, shown in FIG. 2, the digital first value (XD) may be derived from all or part of an input value (XIN) using a first pre-processing stage (PREX). Such pre-processing (PREX) may be based on a variety of functions such as addition of a predetermined value to the input value (XIN) or subtraction of a predetermined value from the input value (XIN), truncation or rotation of the input value (XIN) or any arbitrary logical function which can give a digital first value (XD) based on all or part of the key value (XIN).

Figure 3:
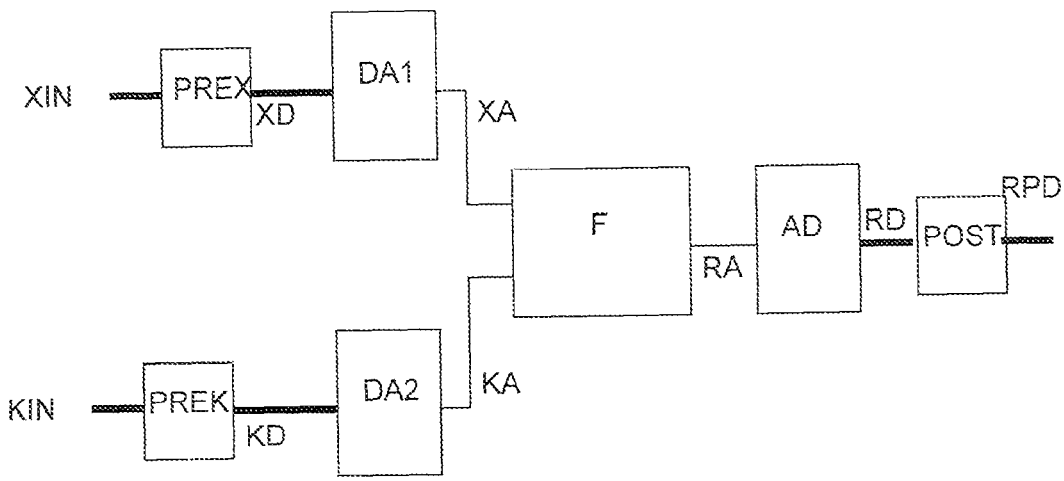

According to yet a further embodiment of the present invention, shown in FIG. 3, the digital second value (KD) may be derived from all or part of a key value (KIN) using a second pre-processing stage (PREK). Such pre-processing (PREK) may be based on a variety of functions such as addition of a predetermined value to the key value (KIN) or subtraction of a predetermined value from the key value (KIN), truncation or rotation of the key value (KIN) or any arbitrary logical function which can give a digital second value (KD) based on all or part of the key value (KIN). Furthermore, as shown in FIG. 3, on the output side the output (RD) may be subject to a post-processing stage (POST) to give a post-processed output (RPD).

According to a preferred embodiment of the present invention either of the pre-processing activities described above may further include some form of truncation for example, or a subdivision of the input value (XIN) or the key value (KIN) in order for the encryption procedure to be carried out in a plurality of iterations or in a plurality of simultaneous parallel branches.

Figure 4:
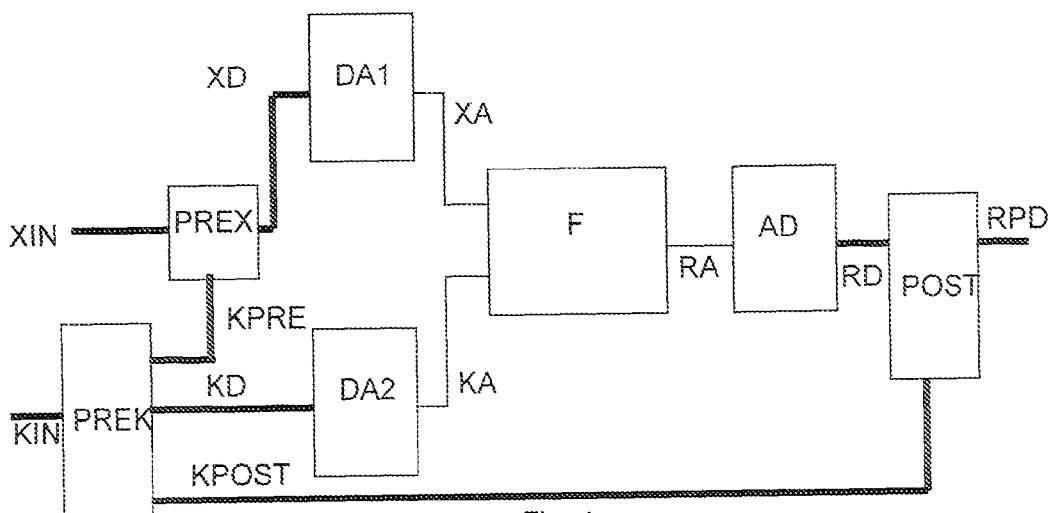

It is worth noting that the first pre-processing stage (PREX) may involve more complex logic and may even entail the use of an encryption (or decryption key). Indeed the key may be the digital second value (KD) or any other derivative of the key value (KIN). FIG. 4 illustrates an example of this, wherein the first pre-processing stage (PREX) applied to the input value (XIN) uses a pre-processing key value (KPRE) which is derived from the key value (KIN). The pre-processing key value (KPRE) may or may not have the same value as the digital second value (KD). Indeed, further keys may be derived as shown in FIG. 4—for example a post-processing key value (KPOST) which may be used as a further input, perhaps functioning as an encryption key (or decryption key) in the post-processing stage (POST). It is worth noting that although the figure shows the digital second value, the pre-processing key value (KPRE) and the post-processing key value (KPOST) as being derived from the same key value (KIN), each of these keys may be completely independent. By the same token, the second digital value (KD), the pre-processing key value (KPRE) and the post-processing key value (KPOST) may indeed be the same.

Seen in more general terms, a complete encryption algorithm which is realisable in digital hardware may be broken down into a plurality of sub-algorithms in order for at least one of the sub-algorithms to be realised as an analogue function using analogue hardware. In this way the goal of rendering difficult the reverse-engineering of the circuit for the purpose of building a software emulator or any other kind of emulator is met.

In an embedment of the present invention, care is taken to ensure the repeatability of the encryption. In an n-bit digital to analogue converter with a range of x volts, each step at the input would correspond to a difference of x/n volts at the output. Conversely, for an m-bit analogue to digital converter with an input range of y volts, a change of y/m volts at the input would lead to a unit change, or step, at the output. For a 16-bit converter with a range of 2V this would give a step size of around 30 uV. As can be appreciated by those skilled in the art of digital to analogue and analogue to digital conversion, such converters are susceptible to a certain amount of error due to such factors as temperature variation, supply voltage or reference voltage variation, electrical noise, conversion speed etc. If the error value is comparable in size to a step size of a converter, then in a system where a digital input is converted to an analogue value and then to a digital output there can be no guarantee that a certain digital input will always lead to the same digital output, since the digital output will vary depending on the errors within the system.

Furthermore, in a chain comprising at least one digital to analogue converter followed by an analogue function followed by an analogue to digital converter, as well as the possibility for error mentioned above, a further error may be introduced in the analogue function due to such factors as electrical noise, supply variations or simply by the analogue function itself having a cumulative or multiplicative effect for example on the errors produced by the converters. For example if the chain had two digital to analogue converters and the analogue function is a multiplication of the two outputs of the digital to analogue converters, then the errors from both digital to analogue converters would also be multiplied at the output of the analogue function.

It is well known in the domain of cryptography that in order to maintain a reasonable level of security for an encryption algorithm realised in digital electronic hardware, the number of bits used to represent the encryption key must be kept reasonably high. On the other hand, as can be seen in the above discussion, if the encryption algorithm, or at least part of the algorithm, were to be realised as an analogue function, then repeatability of such a system is compromised if the number of bits used leads to step sizes which are comparable to the size of the errors inherent in the converters and/or in the analogue function. In other words, the more bits which are used, the less chance there is in being able to build a deterministic system which will yield repeatable results.

In order to circumvent this problem, according to an embodiment of the present invention in which an analogue function is to replicate a part of an encryption algorithm, the analogue function is divided into a plurality of analogue sub-functions. The analogue sub-functions are chosen such that they may be combined to realise the analogue function. Each analogue sub-function receives at least two inputs, namely a first operand and a second operand. via digital to analogue converters and the output from the sub-function goes to an analogue to digital converters to give a sub-solution. The step size and tolerance of the converter, and therefore the optimum number of bits (b), are chosen such that the overall tolerance of the chain including the digital to analogue converters, the sub-function and the analogue to digital converter leads to a deterministic sub-solution for given first and second operands. A plurality of the above mentioned chains are implemented with a view to realising the chosen analogue function. The digital first value is divided into a plurality of b-bit partial digital first values—these are the first operands mentioned above, while the key value is divided into a plurality of b-bit partial key values—these are the second operands mentioned above. The processing of each partial digital first value and partial digital second value through each of the chains yields a plurality of partial results or sub-solutions as mentioned above. The partial results are then combined, either in the digital domain or in the analogue domain, to give a solution to the analogue function. The analogue function is used to realise the chosen part of the overall encryption algorithm.

Figure 5:
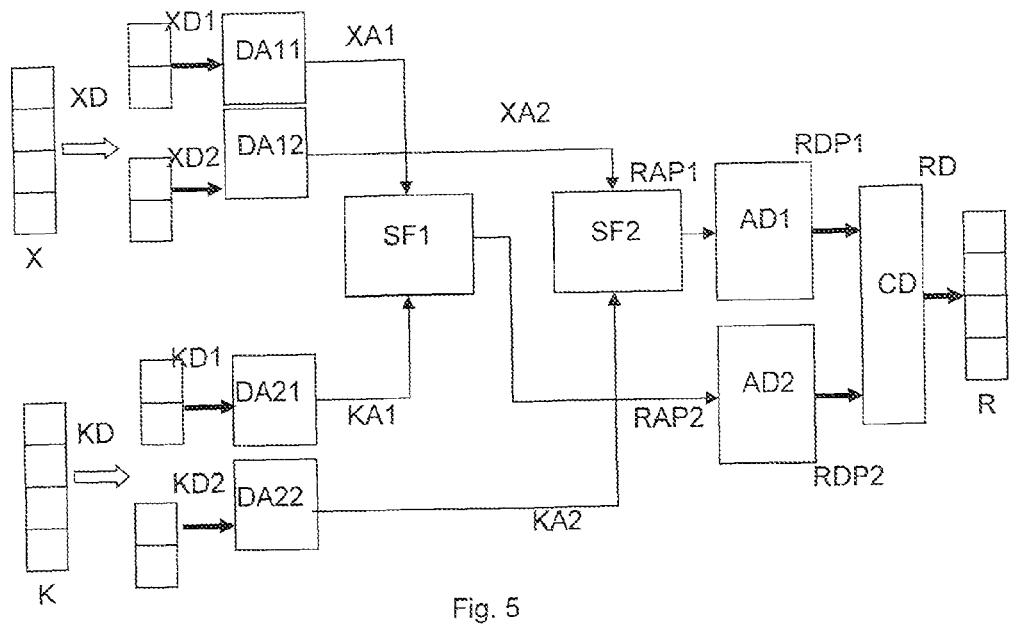
Figure 6:
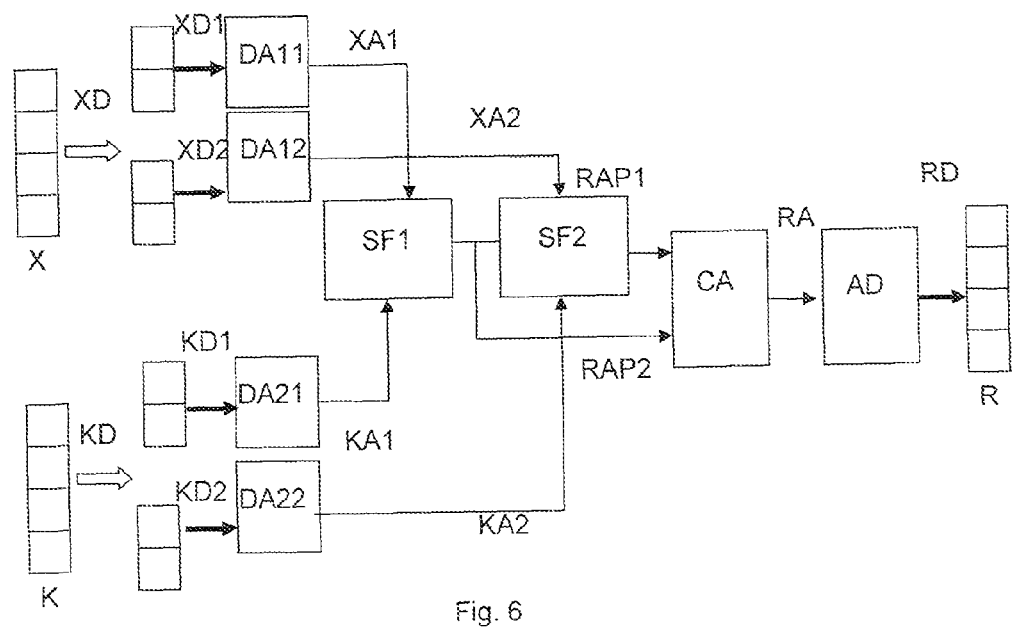

This is illustrated in FIG. 5 where both the digital second value (KD) and the digital first value (XD) are divided into a plurality of partial digital first values (XD1, XD2) and partial digital second values (KD1, KD2). The example shows the digital first value and the key value each being divided into two parts; however it should be appreciated that both values may each be divided into any desired number of parts. Each partial digital first value is converted to a partial analogue first value (XA1, XA2) and each partial digital second value is converted to a partial analogue key value (KA1, KA2). A plurality of analogue sub-function blocks (SF1, SF2) perform analogue functions on a pair of one from the plurality of partial analogue first values and one from the plurality of analogue key values giving a plurality of partial analogue results (RAP1, RAP2). The partial analogue results are converted to a plurality of partial digital results (RDP1 RDP2) using a plurality of analogue to digital converters (AD1, AD2) and the plurality of partial digital results are combined using a predetermined digital combining function (CD) to give the encrypted (or decrypted) digital output value (RD). The combination of the partial digital results yields the same digital output value as would have been achieved had the digital first value (XD) and the digital second value (KD) been processed using the analog function (F) as previously described, it is worth noting that the predetermined digital combining function (CD) may further include the use of the post-processing key value (POST) or any other predetermined key. Alternatively, the partial analogue results (RAP1, RAP2) can be combined in the analogue domain using an analogue combing function (CA) to give an analogue result (RA) before applying the analogue to digital conversion (AD) leading to the encrypted (or decrypted) digital output value (RD). This is illustrated in FIG. 6. The analogue combining function (CA) may or may not use an encryption key, such as the analogue encryption key (KA) for example. In other embodiments of the present invention, the treatment of the partial digital first values and partial digital second values may be done in serial fashion or using a pipelined organisation rather than the parallel architecture described above.

In another embodiment of the present invention, in order to further diversify the result of the encryption, the encrypted output value undergoes a further round, or a plurality of further rounds of encryption. The decision as to how many rounds should be made is based on a trade-off between the speed or performance required and the complexity of the resulting encryption algorithm. Furthermore, each round of encryption does not necessarily have to use the same encryption key. To realise a further round of encryption, the encrypted digital output value (RD) (or the post-processed output value (RPD)) can be fed back to the input to become a new digital first value (XD) (or a new input value XIN) or a further block of hardware can be cascaded onto the output of the first block. Alternatively the further rounds can be achieved in the analogue domain whereby the partial analogue results undergo further processing through analogue sub-functions.

Figure 7:
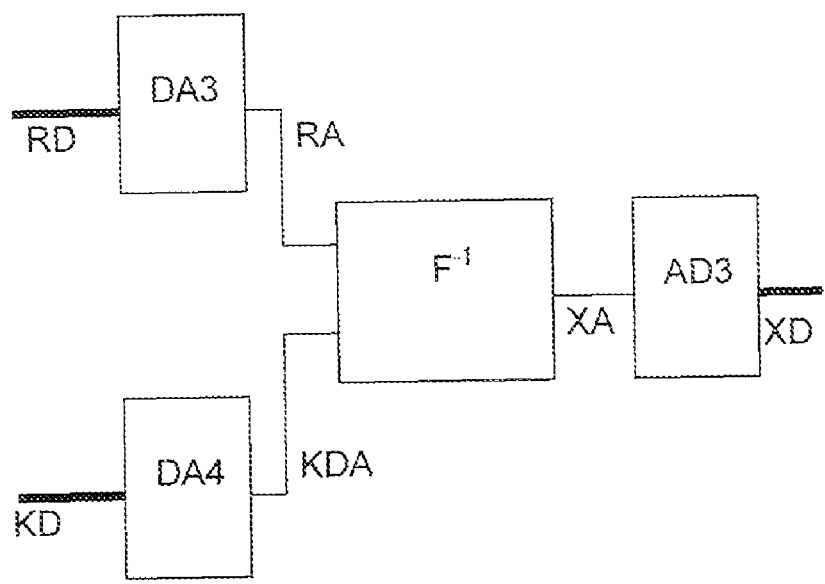
FIG. 7 showing a block diagram of part of a decryption system in which an embodiment of the present invention may be deployed.

FIG. 7 illustrates how decryption of a value encrypted using a function F is achieved according to an embodiment of the present invention. The encrypted value (RD) is converted to an analogue value using the digital to analogue converter (DA1). Similarly a decryption key (KD) is converted from the digital domain to the analogue domain using the digital to analogue converter (DA2). The two analogue values (RA, KDA) are combined using a decrypting analogue function $(F^{-1})$. The result of the decrypting analogue function (XA) is converted from the analogue domain to the digital domain using analogue to digital converter (AD) to give the decrypted value (XD). As in the case of encryption, the decryption key (KD) may be used to derive a decryption sub-key (KSD). in one embodiment of the present invention the decryption key is the same as the encryption key and the decrypting function is the inverse of the encryption function. In another embodiment the decryption key is different from the encryption key while the encryption function is the same as the decryption function. As described in the encryption part, the decryption may be done in a plurality of blocks treating a reduced number of bits, with the key being divided into a plurality of shorter keys and the encrypted value being divided into a plurality of shorter encrypted values to be treated by a plurality of analogue functions with the partial results being combined either in the analogue domain or the digital domain.

The techniques contributing to the achievement of a deterministic encryption system as described above, namely the division of digital values into a plurality of smaller parts may also be applied to the decryption system. Similarly the use of a plurality of rounds may be applied to the decryption system.

The invention claimed is:

1. A method for performing a digital cryptographic function on at least one digital first value and at least one digital second value, said digital cryptographic function having at least one digital result, said method comprising the following steps:
   a) converting the at least one digital first value into at least one analogue first value;
   b) converting the at least one digital second value into at least one analogue key value;
   c) performing an analogue function on the at least one analogue first value and the at least one analogue key value to give at least one analogue output value; and
   d) converting the analogue output value to give a digital output value representing the result of the digital cryptographic function.

2. The method according to claim 1, wherein said at least one digital first value results from a first pre-processing activity carried out on at least all or part of an input value.

3. The method according to claim 1, wherein said at least one digital second value results from a second pre-processing activity carried out on at least all or part of a key value.

4. The method according to claim 3, wherein said second pre-processing activity further generates a pre-processing key value.

5. The method according to claim 4, wherein said first pre-processing activity further acts upon the pre-processing key value.

6. The method according to claim 1, wherein at least all or part of said digital output value is subjected to a post-processing activity to give a post-processed digital output value.

7. The method of claim 6, wherein the post processed digital output value is further processed by the digital cryptographic function.

8. The method according to claim 3, wherein said second pre-processing activity further generates a post-processing key value.

9. The method according to claim 8, wherein said post-processing activity further acts upon the post-processing key value.

10. The method according to claim 3, wherein any of said first pre-processing activity or second pre-processing activity involves generating a plurality of digital first values or second digital values and wherein the plurality of digital first values are converted to a plurality of analogue first values and the plurality of digital second values are converted to a plurality of analogue key values.

11. The method according to claim 1, wherein said analogue function is divided into a plurality of analogue sub-functions, at least two of said analogue sub-functions acting upon at least one of said at least one analogue first values and at least one of said at least one analogue key values to give a plurality of partial analogue results, said plurality of partial analogue results being subjected to a combining sub-function in order to yield the analogue output value.

12. The method according to claim 1, wherein said analogue function is divided into a plurality of analogue sub-functions, each of said analogue sub-functions acting upon at least one of said at least one analogue first values and at least one of said at least one analogue key values to give a plurality of partial analogue results, said plurality of partial analogue results being converted to a plurality of partial digital results, said plurality of partial digital results being combined to yield the digital output value.

13. The method according to claim 1, wherein said conversion of the at least one digital first value or the at least one digital second value converts from a selection of voltage to current, voltage to charge, or voltage to frequency and said conversion of the analogue output value converts between a selection of current to voltage, charge to voltage or frequency to voltage.

14. The method according to claim 3, wherein any of said input value or said key value comprises n bits or m bits respectively and any of said digital first value or said digital key value comprises a number of bits which is less than n or m respectively.

15. The method according to claim 1, wherein the digital output value is further processed at least once by the digital cryptographic function.

16. A device for performing a digital cryptographic function on at least one digital first value and at least one digital second value, said digital cryptographic function having at least one digital result, said device comprising:
- at least one first digital to analogue converter to convert the at least one digital first value into at least one analogue first value;
- at least one second digital to analogue converter to convert the at least one digital second value into at least one analogue key value;
- hardware suitable for realizing an analogue function acting on said analogue first value and said analogue key value to give an analogue result; and
- at least one analogue to digital converter to convert said analogue result into a digital value to give a digital output value representing the result of the digital cryptographic function.

17. The device according to claim 16, wherein at least all or part of said digital value is subjected to a post-processing activity to give a post-processed digital output value.

18. The device according to claim 16, wherein said at least one digital second value results from a second pre-processing activity carried out on at least all or part of a key value.

* * * * *

UNITED STATES PATENT AND TRADEMARK OFFICE
CERTIFICATE OF CORRECTION

PATENT NO. : 8,355,500 B2
APPLICATION NO. : 13/077195
DATED : January 15, 2013
INVENTOR(S) : Jerome Perrine et al.

It is certified that error appears in the above-identified patent and that said Letters Patent is hereby corrected as shown below:

In the Specifications:
Column 1, Line 36 --the use different keys-- should be "the use of different keys".
Column 1, Line 37 --in-- should be "In".
Column 2, Line 27 --describes-- should be "described".
Column 4, Line 67 --key value (XIN)-- should be "input value (XIN)".
Column 5, Line 51 --In an embedment-- should be "In an embodiment".
Column 6, Line 38 --converters-- should be "converter".
Column 7, Line 6 --(RDP1 RDP2)-- should be "(RDP1, RDP2)".
Column 7, Line 14 --described. it-- should be "described. It".
Column 7, Line 19 --combing function-- should be "combining function".
Column 7, Line 59 --(KSD). in-- should be "(KSD). In".

Signed and Sealed this
Fourth Day of June, 2013

Teresa Stanek Rea
*Acting Director of the United States Patent and Trademark Office*